(12) United States Patent
Al-Salameh et al.

(10) Patent No.: US 6,317,231 B1
(45) Date of Patent: Nov. 13, 2001

(54) OPTICAL MONITORING APPARATUS AND METHOD FOR NETWORK PROVISIONING AND MAINTENANCE

(75) Inventors: Daniel Yousef Al-Salameh; Gabriela Livescu, both of Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/148,355

(22) Filed: Sep. 4, 1998

(51) Int. Cl.[7] .................................................. H04B 10/08
(52) U.S. Cl. ............................ 359/110; 319/119; 319/124
(58) Field of Search ................................... 359/110, 119, 359/124, 177; 370/907

(56) References Cited

U.S. PATENT DOCUMENTS

| 5,757,526 | 5/1998 | Shiragaki et al. | |
| 6,040,933 | * 3/2000 | Khaleghi et al. | 359/124 |
| 6,055,078 | * 4/2000 | Chen et al. | 359/110 |
| 6,204,945 | * 3/2001 | Iwata et al. | 359/124 |
| 6,219,162 | * 4/2001 | Barnard et al. | 359/124 |

OTHER PUBLICATIONS

A Demostration of an Optical Cross–Connect System for a Self–Healing Optical Network; H. Takeshita, S. Takahashi, T. Kato, S. Kitamura, H. Harano and N. Henmi. ECOC—Sep. 1997, Edinburgh, UK.

Demonstration of Virtual Wavelength Path Cross–Connect; Mitsuhiro Teshima, Takeshi Kawai, Norio Sakaida, Hiroyuki Ishii and Masafumi Koga. ECOC, Sep. 1997, Edinburgh, UK.

A Novel Passive Surveillance Scheme for Optical Transmission Systems With Multiple In–Line Optical Amplifiers; Chun–K. Chan, Lian–K. Chen, Frank Tong and Dennis Lam. ECOC—Sep. 1997, Edinburgh, UK.

In–Service Inter–Span Fault Monitoring On Multi–Repeated WDM Transmission System; Yukio Horiuchi, Tomohiro Otani, Shu Yamamoto and Shigeyuki Akiba. ECOC—Sep. 1997, Edinburgh, UK.

1997, Edinburgh, UK.

Optical Monitoring Using Data Correlation for WDM Systems; L.E. Nelson, S.T. Cundiff and C.R. Giles. IEEE Photonics Technology Letters, vol. 10, No. 7, Jul. 1998, pp. 1030–32.

A High–Performance Optical Spectrum Monitor With High--Speed Measuring Time for WDM Optical Networks; K. Otsuka, T. Maki, Y. Sampei, Y. Tachikawa, N. Fukushima and T. Chikama. ECOC—Sep. 1997—Edinburgh, UK.

* cited by examiner

Primary Examiner—Kinfe-Michael Negash
(74) Attorney, Agent, or Firm—Guy H. Eriksen

(57) ABSTRACT

Optical-to-electrical and electrical-to-optical signal conversion is substantially eliminated for performance of monitoring and maintenance functions within a wavelength-division-multiplexed optical network having a Network Control Element by detecting optical intensities of signals conveyed over wavelength channels at the optical layer. Values associated with the detected optical intensities are generated and conveyed to the Network Control Element. The Network Control element analyzes these values for the purposes of fault detection, channel power monitoring, channel signal to noise ratio determinations, channel continuity checks, and network provisioning.

12 Claims, 3 Drawing Sheets

200

OPTICAL MONITORING APPARATUS AND METHOD FOR NETWORK PROVISIONING AND MAINTENANCE

FIELD OF THE INVENTION

The present invention relates to the field of optical fiber signal transmission, and more particularly to monitoring and maintenance functions within an optical network.

BACKGROUND OF THE INVENTION

Wavelength-division-multiplexing (WDM) optical networks are becoming increasingly complex as the number of wavelength channels transportable over a single fiber increases and as the number of channels added/dropped at various sites within the network and/or exchanged between two or more optical networks increases. Increasingly, the costs associated with such complex networks are extremely high, in large part due to the need for many necessary monitoring and maintenance functions to be performed at the electrical signal layer rather than at the optical signal layer. Performance of a particular operation or maintenance function at the electrical layer is costly because it requires conversion of the optical signal conveyed over the network to an electrical signal before performing a particular function and then reconversion back to an optical signal for further transmission over the optical network.

For example, prior to the development of the optical amplifier, repeater sites incorporated within optical networks were implemented utilizing regenerators. A regenerator provided optical signal amplification by first converting an optical signal to an electrical signal, amplifying the electrical signal, and then reconverting the electrical signal to an optical signal for launching back onto the optical network. Thus, adjacent repeater sites were separated by optical transmission sections, with overhead being read and recreated at each repeater site. Network monitoring was only performed at portions of the network where such optical to electrical conversions were made, and therefore management of the network and network elements was performed entirely in the electrical layer. Such network management required additional data overhead as well, in order to transmit management and monitoring data within the network.

Development of the optical amplifier and wavelength-division-multiplexed networks have revolutionized the management of networks: repeaters are now incorporated within the optical layer; and so are wavelength multiplexers, optical Add/Drop sites, and optical crossconnects. An increasing percentage of the optical network has become transparent, bit rate independent, and format independent. These advances have enabled increased network bandwidth and speed. Unfortunately, monitoring and management of WDM network signal processes, such as fault detection, optical signal strength detection, and optical signal to noise ratio determinations, have not been incorporated as functions within the optical layer itself. That is, such network monitoring and management requires conversion of optical signals to electrical signals prior to performing the monitoring and/or management function, and then reconversion back to an optical signal for conveyance over the optical network.

SUMMARY OF THE INVENTION

Optical-to-electrical and electrical-to-optical signal conversion is substantially eliminated, for performance of monitoring and maintenance functions within a wavelength-division-multiplexed optical network having a Network Control Element, by detecting optical intensities of signals conveyed over wavelength channels at the optical layer. Values associated with the detected optical intensities are generated and conveyed to the Network Control Element. The Network Control element analyzes these values for the purposes of fault detection, channel power monitoring, channel signal to noise ratio determinations, channel continuity checks, and network provisioning.

Advantageously, implementation of the present invention within an optical network increases system reliability, speed, and performance, since repeated optical-to-electrical and electrical-to-optical signal conversion is not required. Moreover, capital and O&M costs associated with providing and maintaining network monitoring equipment is reduced since less equipment is utilized to perform the network monitoring and maintenance functions.

BRIEF DESCRIPTION OF THE DRAWINGS

A more complete understanding of the present invention may be obtained from consideration of the following description in conjunction with the drawings in which.

DETAILED DESCRIPTION

Figure 1:
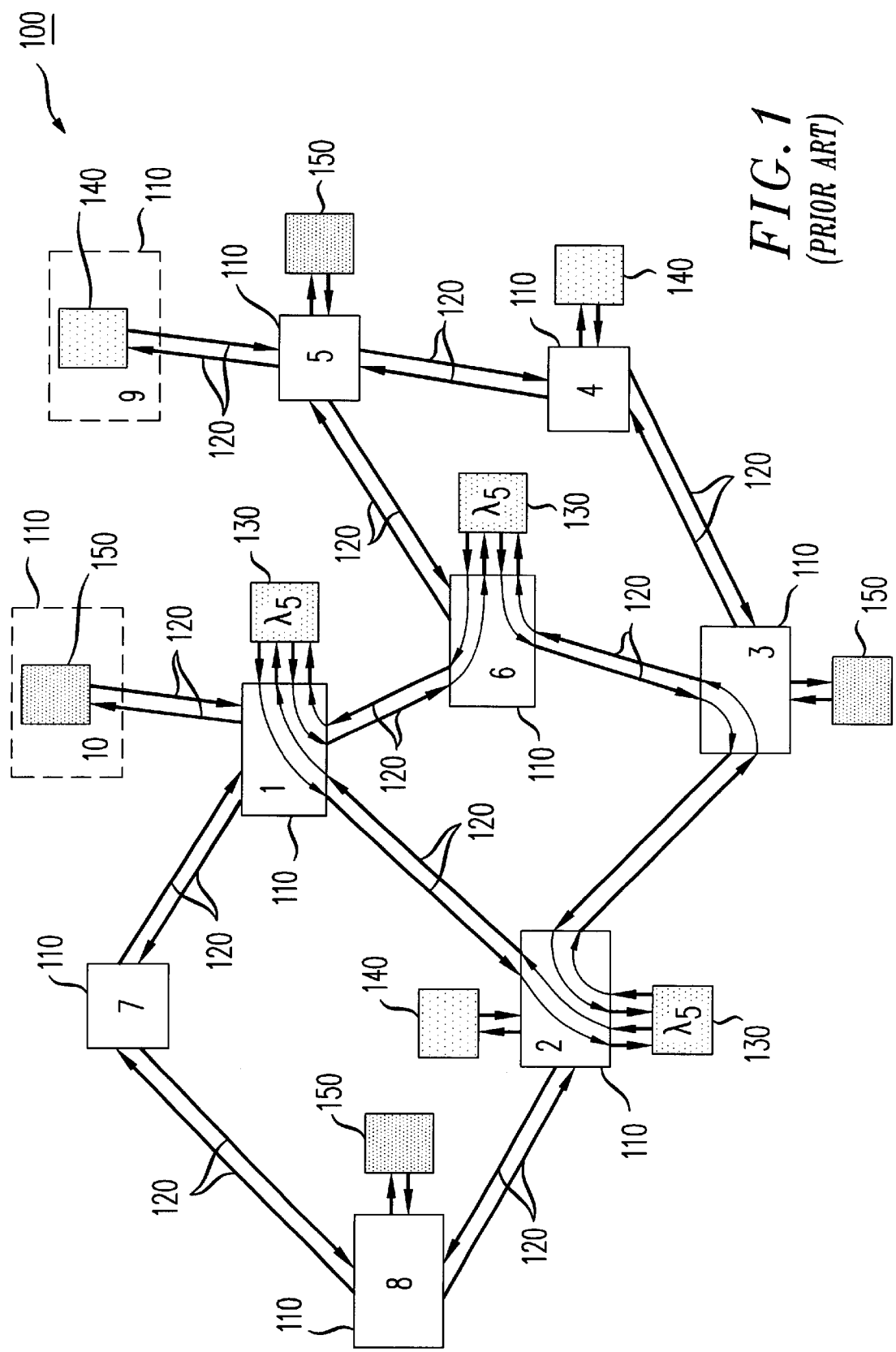
FIG. 1 is a block diagram of a wavelength division multiplexed (WDM) optical network incorporating a plurality of architecture topologies and utilizing a plurality of optical protocols.

Referring to FIG. 1, there is shown an exemplary wavelength division multiplexed (WDM) optical network 100 comprising ten Add/Drop sites 110 and interconnecting optical fiber lines 120. Each of the lines 120 connecting the sites which comprise the network may independently carry a varying number of channels and may incorporate and support a variety of data protocols and formats. For example, the illustratively thick lines interconnecting sites 1, 2, 3, and 6 represent a dense wavelength division multiplexed (DWDM) synchronous optical network (SONET) ring connecting three SONET terminals 130, each supporting data exchange at a channel wavelength of $\lambda_5$. For the purpose of providing a comparative illustration, the SONET ring interconnecting sites 1, 2, 3, and 6 may have a data capacity of 40 or more wavelength channels, whereas the remaining network optical fiber lines (between the following Add/Drop sites pairs: 2&8, 8&7, 7&1, 1&10, 6&5, 5&9, 5&4, and 4&3) may be limited in capacity to 16 or fewer channels.

Within the optical network 100, channels are added and dropped at various Add/Drop sites 110. For example, SONET ring terminals 130 access optical signals operating at wavelength $\lambda_5$, through Add/Drop sites 1, 2, and 6. Point-to-point optical connections between plesiochronous digital hierarchy (PDH) terminals 140 are also maintained. PDH terminals 140 are shown accessing the network 100 at Add/Drop sites 2, 4, and 9. A complex mesh of optical connections between ATM switches 150 is also illustrated; with ATM switches 150 connected to the network 100 at Add/Drop sites 3, 5, 8, and 10. Bi-directional optical fiber lines 120 between Add/Drop sites 110 are utilized to convey optical signals originating and/or terminating at the various terminals 130, 140 and switches 150.

Although the present invention will be described within a WDM SONET optical ring network, utilization of the present invention is not to be construed as being limited to such an application. Rather, the present invention functions at the network optical layer and thus network specific protocols, data structures, and formats are transparent to its operation. Additionally, various network architectures and topologies are also compatible for utilization with the present invention. The optical network of FIG. 1 is presented here merely as an illustrative example of an optical network encompassing some of the various protocols, data structures, formats, architectures, and topologies with which the present invention is compatible, and not as an exhaustive list of its application.

Figure 2:
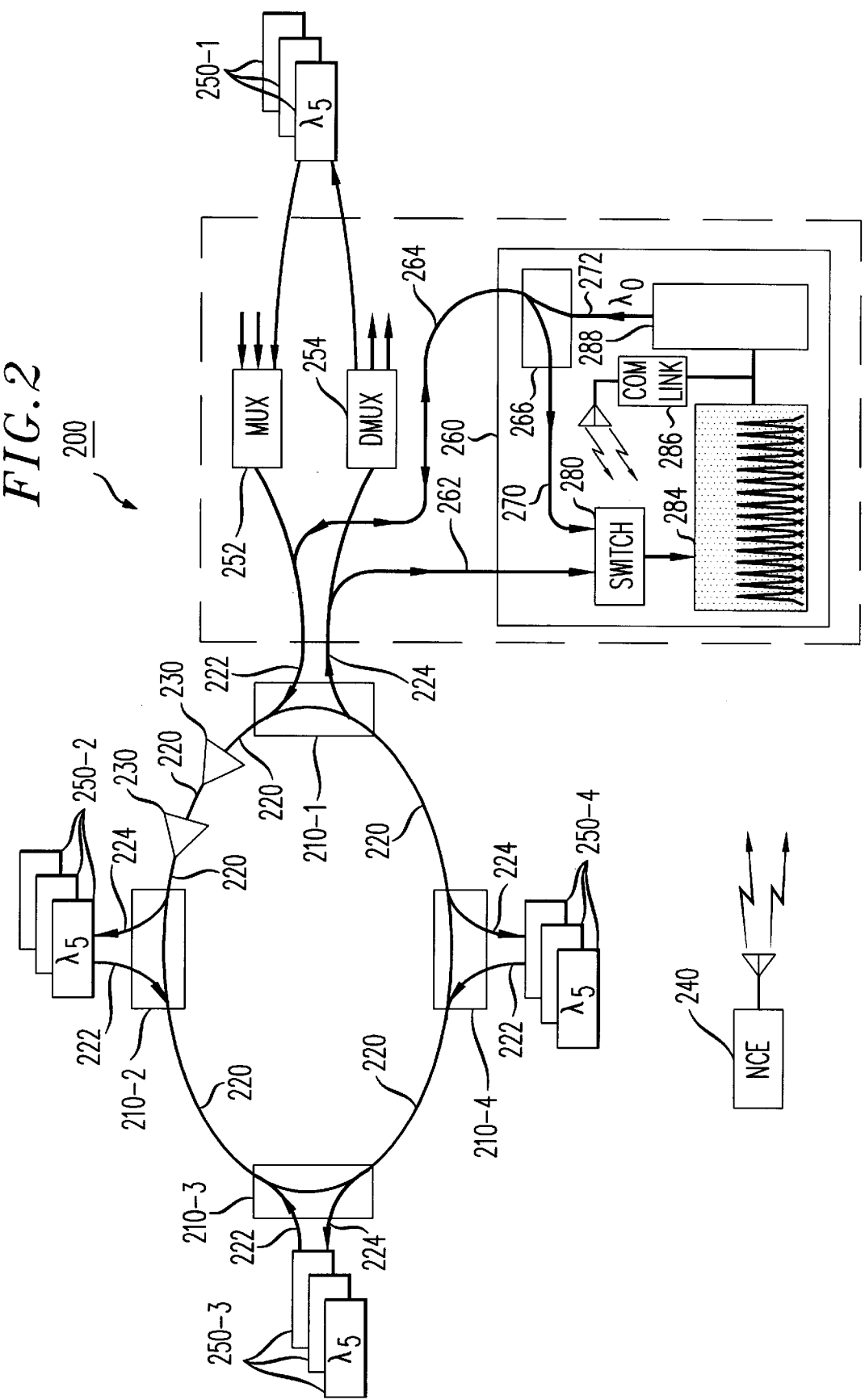
FIG. 2 is a diagram of an exemplary embodiment of the present invention, in which a WDM optical ring network incorporates an optical monitoring unit at each wavelength Add/Drop site.

Referring now to FIG. 2, there is illustrated a WDM SONET ring network 200. Add/Drop sites 210 are optically coupled in a ring topology via at least one optical fiber line 220. SONET terminals 250 are optically coupled to respective Add/Drop sites 210 via add fibers 222 and drop fibers 224. Add/Drop sites 210 are operable to launch and retrieve a plurality of optical signal wavelengths (channels) to supply and service a corresponding plurality of SONET terminals 250. However, for the purpose of clarity, only those SONET terminals 250 operating with a channel wavelength of 5 are shown as being optically coupled to the Add/Drop site (and therefore to the network ring) via an add fiber 222 and drop fiber 224. Interposed along and optically coupled with the optical fiber line 220 between Add/Drop site 210-1 and Add/Drop site 210-2 are a plurality of optical amplifiers 230. Optical amplifiers 230 are utilized to amplify the signals transmitted at the optical layer without the necessity of first converting to an electrical signal. Any number of other optical and/or electrical equipment and components including, nodes, switches, attenuators, amplifiers, regenerators and the like, may also be incorporated within an optical network 200 utilizing the present invention for optical monitoring without adversely affecting the performance of the optical monitoring system, as would be apparent to those skilled in the art.

Interposed between each network servicing Add/Drop site 210 and its corresponding SONET terminals 250 (but illustrated in FIG. 2 only in conjunction with Add/Drop site 210-1 and corresponding SONET terminals 250-1) are a multiplexer 252, demultiplexer 254, and an optical monitoring unit 260. SONET terminal 250-1 operating with a channel wavelength of $\lambda_5$ is optically coupled to provide signal data to multiplexer 252 and receive signal data from demultiplexer 254. Similarly, SONET terminals 250-1 serviced by corresponding Add/Drop site 210-1, but operating with channel wavelengths other than $\lambda_5$, are also optically coupled to provide signal data to multiplexer 252 and receive signal data from demultiplexer 254. Multiplexer 252 provides a multiplexed optical signal comprised of data from SONET terminals 250-1 for injection along network optical fiber lines 220 via the add fiber line 222. Demultiplexer 254 provides demultiplexed optical data signals to a plurality of SONET terminals 250-1, each demultiplexed optical signal modulated to an appropriate channel wavelength for each corresponding SONET terminal 250-1. The demultiplexer receives a multiplexed signal from the network optical fiber lines 220 through Add/Drop site 210-1 via the drop fiber line 224.

Thus, excluding an Optical Monitoring Unit (OMU) 260 (subsequently described) and the components which comprise the OMU 260 and which interconnect the OMU to the Add/Drop site 250-1, FIG. 2 represents a simplified optical network model in which $\lambda_5$ is assigned to one SONET ring while sharing the fiber with other channels (wavelengths). The SONET terminals 250 at each site receive a number of dropped channels, and generate a correspondingly equal number of added channels, each SONET terminal 250 conveying signal data at a single wavelength or channel. Terminals conveying signal data at the same wavelength, for example the $\lambda_5$ SONET terminals 130 of FIG. 1, form a ring. A network may contain many such rings, each conveying a different wavelength, and each sharing the same fiber within a WDM scheme. An Optical Monitoring Unit (OMU) 260 is optically coupled to the add fiber line 222 and to the drop fiber line 224 for each Add/Drop site 210. Each OMU 260 is comprised of an Optical Analyzer (OA) 284 which measures the optical spectrum intensity (means for measuring power across the network wavelength spectrum), an optical pilot tone generator (OPTG) 288 (means for producing and emitting optical energy having a wavelength of $\lambda_o$, $\lambda_o$ being a wavelength within the WDM signal spectrum band), and a means for transmitting 286 the quantified data measured by the OA 284 to a Network Control Element (NCE) 240 and receiving command and control messages transmitted by the NCE 240 for OA 284 and OPTG 288 operation. The NCE 240 is a well-known apparatus providing a centralized monitor and control location for the entire network, typically operated and managed by the service provider or network manager. The NCE 240 coordinates, controls, and manages key network functions, such as network configuration, fault management, performance monitoring, accountability and security. Various means for transmitting the quantified data from the OA 284 to the NCE 240 and various means for receiving command and control messages transmitted by the NCE would be apparent to those skilled in the art. One means for transmitting/receiving data and control messages between the OA 284 to the NCE 240 is to convey the message directly over the optical layer of the network whose performance is being monitored; although if a network fault does exist, the possibility that the OA will not be able to report the fault to the NCE because of the very same detected network fault is indeed a possibility. Other means include signaling and messaging between network OA's 284 and the NCE 240 via PSTN lines, coaxial cable, wireless communication, ancillary or dedicated optical fiber, or any other well known means for the conveyance of data from one geographic location to another.

Several alternatives are presently available for producing a suitable OA 284, each of which may be classified within one of a few basic categories. A first category of optical analyzer utilizes a scanning dispersive element, followed by a fixed detector, such as a scanning Fabry-Perot (FP) filter. For current applications having large numbers of closely spaced channels (50–100 GHz), optical analyzers utilizing this approach impose stringent performance specifications on the filters. Presently, commercially available bulk glass or fiber FP filters can achieve a spectral resolution of 0.07 nm (<10 GHz), and a power accuracy of ±0.5 dBm.

A second category of optical analyzer for use in conjunction with the present invention utilizes a fixed dispersive element, for example a dispersion grating or a waveguide router, followed by an array of detectors. An example of this type of optical analyzer is described by J. L. Wagener et al. in *Proceedings of the ECOC '97*, Vol. 5, pg. 65, in which a monitor composed of a blazed and chirped fiber Bragg grating is utilized. A 256 element detector array is coupled to the fiber Bragg grating. The device delivers performance equivalent to a single pass optical spectrum analyzer over the entire spectral range of the device, with 0.1 nm (12.5 GHz) resolution and a power detection accuracy of ±0.5 dBm. Other examples of a second category optical analyzer include: (i) a device comprised of a bulk diffraction grating followed by a 256 p-i-n photodiode array, utilized to control the power of channels entering an Add/Drop node, as described by K. Otsuka et al. in *Proceedings of ECOC '97*, Vol. 2, pg. 147; (ii) a waveguide router with 18 arms followed by a 36 pixel detector array, used to control the wavelength of eight lasers acting as regenerators in an optical crossconnect with wavelength conversion, as described by M. Teshima et al., in *Proceedings of ECOC '97*, Vol. 3, pg. 59; and (iii) an optical analyzer device used to perform network fault detection, such as reporting loss of wavelength, loss of signal, and optical signal degradation in an optical crossconnect, as described by H. Takeshita et al., in *Proceedings of ECOC '97*, Vol. 3, pg. 335.

A third category of optical analyzer for use in conjunction with the present invention is based on mapping of wavelength into time delay groups by using group-velocity dispersion in fiber, as described in "Optical Monitoring using Data Correlation for WDM Systems," L. E. Nelson, S. T. Cundiff, and C. R. Giles, *IEEE Photonics Technology Letters*, Vol. 10, No. 7, July 1998, pp. 1030–32.

Utilizing this method, a multi-wavelength input is passed through a series of fiber gratings, which temporally separate the various wavelengths. Different wavelength groups are identified and quantified by the time delay associated with each particular wavelength group in arriving at a fixed detector. Identification of individual channels may be performed either by asynchronously modulating each at a low duty cycle, or by utilizing data correlation to determine the time shift of the channels.

Yet other devices for performing multi-channel, widespectrum optical analysis may also be utilized in conjunction with the present invention, as would be readily apparent to those skilled in the art.

At each Add/Drop site 210, the Optical Analyzer (OA) 284 is optically coupled to the add fiber line 222 and to the drop fiber line 224 to selectively provide the OA with light from each. It should be noted that although the description included herein refers solely to optically coupling an OA (and therefore the corresponding OMU) at various network Add/Drop sites, the present invention is equally applicable and useful when optically coupled or tapped at any location within the optical network; since the present invention detects signals at the optical layer without first requiring conversion to an electrical signal. In the instant embodiment of the present invention, light from the drop fiber line 224 is conveyed to the OA 284 over a drop monitoring line 262 which is optically tapped to the drop fiber line 224 at a first end and optically coupled to a first input of a two input optical switch 280 at its second end. The output of switch 280 is then optically coupled as an input to the OA 284. Light from the add fiber line 222 is conveyed to the OA 284 over an add test line 264 which is optically tapped to the add fiber line 222 at a first end and optically coupled to the distributing input of a 1×2 optical splitter 266 at its second end. A first distributed output of the 1×2 optical splitter 266 is then optically coupled via an add monitoring line 270 to a second input of the two input optical switch 280. Switch 280 is utilized to select whether the desired location which the OA is to monitor is the add fiber line 222 or the drop fiber line 224.

A second distributed output of the 1×2 optical splitter 266 is optically coupled to the optical pilot tone generator 288. The optical pilot tone generator 288 is a light emitting device, such as a laser, operable to provide a test signal having a wavelength $\lambda_0$ as an output. Light emitting devices other than lasers may also be utilized as an optical pilot tone generator, as would be apparent to those skilled in the art. The optical pilot tone generator 288 is coupled to provide an optical test signal through splitter 266, over add test line 264, onto add fiber line 222 and onto the optical fiber line 220 which comprises the SONET ring via Add/Drop site 210-1.

Advantageously, the present invention enables performance of in-service and out-of-service network management and maintenance functions at the network optical layer, and more specifically enables features not currently available under the SONET standard. For example, in-service maintenance capabilities provided by the present invention include fault isolation and optical performance monitoring. Out-of-service testing capabilities provided by the present invention include channel continuity checks, channel power delivery performance checks, and Optical Signal to Noise Ratio (OSNR) checks. The above recited list of maintenance and management functions and features are not intended as an exhaustive list, but merely as illustrative. Still other tests, checks, measurements, and functions are enabled for performance with the present invention, as would be known to those skilled in the art.

Figure 3:
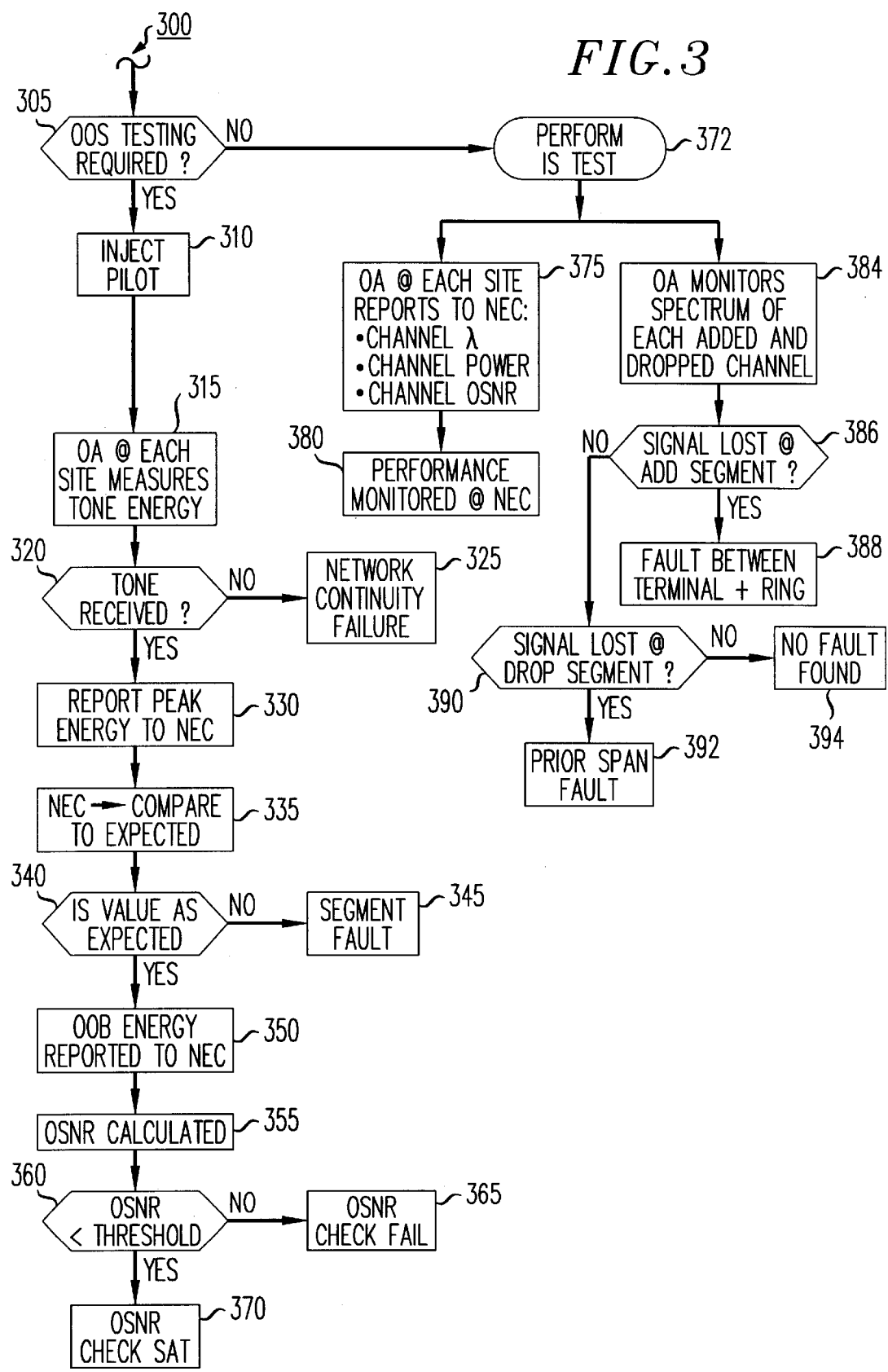
FIG. 3 is a process diagram illustrating the interrelationship of the functional steps comprising an exemplary embodiment of the present invention.

Referring now to FIG. 3, there is illustrated a functional block diagram 300 for performance of the aforementioned in-service (IS) and out-of-service (OOS) network management and maintenance functions. Commencing at step 305, the Network Control Element (NCE) 240 for the network illustrated in FIG. 2 determines whether OOS or IS testing and/or monitoring is to be performed. As previously described, each of the Add/Drop sites (210-1 through 210-4) of FIG. 2 is equipped with and coupled to an Optical Monitoring Unit (OMU) 260. The NCE 240 coordinates and controls each OMU 260 within the network, and the associated components within each OMU, via data messaging signals. Return messages from each OMU 260 to the NCE 240 provide a mechanism for reporting Add/Drop site status and OA 284 measured performance and test data to the NCE.

If OOS tests are to be performed, the NCE 240 signals the optical pilot tone generator (OPTG) 288 associated with the appropriate Add/Drop site 210 to inject an optical signal at wavelength $\lambda_0$ over the optical fiber line 220 of the network, in accordance with step 310. For purposes of clarity of description, it is assumed that the NCE signals the OPTG 288 associated with Add/Drop site 210-1. However, since the OMU 260 associated with every other Add/Drop site 210 is also equipped with an OPTG 288, the present description of system operation applies equally well when the NCE signals OPTG's associated with other network Add/Drop sites (210-2 through 210-4) to inject an optical signal.

The OPTG 288, when triggered, launches an optical test signal at wavelength $\lambda_0$ through the 1×2 optical splitter 266, over add test line 264, over add fiber line 222, through Add/Drop site 210-1 and onto the optical fiber line 220 of the network. In accordance with step 315, the Optical Monitoring Unit (OMU) 260 for each Add/Drop site 210 within the network measures the power received for a plurality of wavelength channels across the network's WDM spectrum with its respective Optical Analyzer 284. Each OA within the network verifies that an optical pilot tone ($\lambda_0$) is received, in accordance with step 320. If one or more OA's within the network have not received an optical pilot tone, then a continuity failure has occurred within the network, in accordance with step 325, and the respective OA(s) not receiving an optical pilot tone transmit a message to the NCE 240 that there is a network continuity failure. For example, if OA corresponding to Add/Drop site 210-3 does not receive a transmitted optical pilot tone, but the OA corresponding to Add/Drop site 210-2 does receive a transmitted optical pilot tone, the NCE determines that there is a network continuity failure and that the failure has occurred along the optical fiber line 220 between Add/Drop site 210-2 and Add/Drop site 210-3.

Referring to step 330, the peak power spectrum profile determined by the OA 284 corresponding to each Add/Drop site 210 within the network is reported via message to the NCE 240. The NCE compares the reported power spectrum profile for each reporting OA with an expected power spectrum profile for each reporting OA (based upon known losses along the various paths from OPTG 288 to each reporting OA), in accordance with step 335. If the magnitude of the difference between a reported profile and a corresponding expected profile ($PWR_{13}$ CHK_SUM) is greater than a predetermined threshold value (PWR_CHK_THRESH), then in accordance with step 340, a network segment fault is indicated. The NCE 240 isolates the segment fault to a segment of optical fiber line 220 coupling two Add/Drop sites 210, one Add/Drop site 210 having an OA 284 reporting a PWR_CHK_SUM magnitude less than the PWR_CHK_THRESH value and the second Add/Drop site 210 having an OA 284 reporting a PWR_CHK_SUM magnitude greater than the PWR_CHK_THRESH value. Utilizing a laser (OPTG 288) having a $\lambda_O$ at the center of the WDM signal band ensures that reported information is representative of any channel that may be transmitted over the network.

In addition to OOS testing for network continuity (per step 320) and network segment faults (per step 340), the present invention is also operable to perform system OOS optical signal to noise ratio (OSNR) checks. Since the OPTG 288 injects an optical pilot tone signal at wavelength $\lambda_O$ over the network optical fiber line 220 in accordance with step 310, and since the peak power spectrum profile determined by the OA 284 corresponding to each Add/Drop site 210 within the network is reported to the NCE in accordance with step 330, an OSNR is readily determined by the NCE for each network Add/Drop site. In accordance with step 350, the NCE 240 accesses the data received from each OA 284 and isolates and quantifies the spectral power reported at wavelength $\lambda_O$ and sums the total out-of-band (OOB) spectral power (at wavelengths other than $\lambda_O$), in accordance with step 350. The NCE 240 then calculates the OSNR for the network signal at each Add/Drop site 210 by comparing the calculated OSNR to a threshold value, in accordance with step 360. Referring to step 370, an OSNR below the threshold value indicates a satisfactory network physical layer. However, in accordance with step 365, a degradation of the OSNR beyond the threshold value is indicative of a network fault or an unacceptable network performance degradation.

Referring now to step 372, if in service (IS) monitoring or tests are to be performed, then injection of an optical pilot tone signal at each OMU (260) is not required. Rather, IS tests utilize the OA 284 incorporated within each OMU 260 to conduct passive checks and monitoring of system optical data signals to determine the network health. In step 375, the OA's 284 at each Add/Drop site 210 report to the NCE the wavelength, peak power and OSNR for each channel. Performance is monitored at the NCE 240 in accordance with step 380. As previously described in conjunction with OOS testing, any degradation of the OSNR is reported to the NCE and can be isolated to the appropriate faulty optical fiber segment or component within the network.

Furthermore, since the OA 284 monitors the spectrum of dropped and added channels at each Add/Drop site 210 within the network, in accordance with step 384, the present invention also provides aid in further isolating a network fault to an add fiber segment or drop fiber segment. In step 386, an OA 284 monitors for a loss of a detected in service (IS) optical data signal at the add segment of a particular Add/Drop site 210. If the optical data signal is lost along an add segment, then a segment failure is indicated between the associated terminal 250 and its respective Add/Drop site 210, in accordance with step 388. In step 390, the optical data signal at the drop segment for a particular Add/Drop site 210 is monitored. If no loss of an optical data signal is detected by the OA 284 along the drop segment, then no fault is indicated at that Add/Drop site 210, in accordance with step 394. If however, a loss of an optical data signal is detected by the OA 284 along the drop segment of a corresponding Add/Drop site 210, then a prior segment fault is indicated, in accordance with step 392. For example, assume that an optical data signal is not detected (while IS monitoring is activated) at the drop fiber line 224 corresponding to Add/Drop site 210-1. If it is also assumed that an optical data signal is detected at the drop fiber line 224 corresponding to Add/Drop site 210-4, then the fault is isolated to a intermediate location between Add/Drop site 210-1 and Add/Drop site 210-4. Fault determination and isolation occurs at the NCE 240 since monitoring data from each of the OA's 284 is conveyed to the NCE via messaging signals.

Numerous modifications and alternative embodiments of the invention will be apparent to those skilled in the art in view of the foregoing description. For example, several currently available alternatives are described within this specification for producing an Optical Analyzer suitable for performing its intended function within the Optical Monitoring Unit. As advances in optical networking technologies and materials continue, it is anticipated that other means and methods for producing viable Optical Analyzers will emerge. Their incorporation within the present invention as a means for optical spectrum analysis would therefore be apparent to those skilled in the art as functional equivalents.

Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. A method of monitoring a plurality of wavelength channels within a an optical network having a Network Control Element, said method comprising the steps of:

detecting, at the optical layer and at a first location within said optical network, a plurality of optical intensities corresponding to said plurality of wavelength channels associated with said optical network;

converting said plurality of optical intensities to a corresponding plurality of optical intensity signal values;

conveying said corresponding plurality of optical intensity signal values to said Network Control Element; and analyzing, at said Network Control Element, said corresponding plurality of optical intensity signal values to determine whether a fault exists within said optical network.

2. The method in accordance with claim 1 wherein said optical network is a wavelength-division-multiplexed optical network.

3. The method in accordance with claim 1 further comprising the step of:

launching an optical test signal onto said optical network to perform out-of-service fault testing of said optical network.

4. The method in accordance with claim 3 wherein a laser is utilized to perform the step of launching said optical test signal onto said optical network.

5. The method in accordance with claim 1 further comprising the steps of:

detecting, at the optical layer and at a second location within said optical network, a second plurality of optical intensities corresponding to said plurality of wavelength channels associated with said optical network;

converting said second plurality of optical intensities to a corresponding second plurality of optical intensity signal values;

conveying said corresponding second plurality of optical intensity signal values to said Network Control Element; and comparing, at said Network Control Element, said corresponding plurality of optical intensity signal values with said second corresponding plurality of optical intensity signal values to locate a detected fault within said optical network.

6. The method in accordance with claim 1 wherein said Network Control Element is further operable to monitor channel power for each of said plurality of wavelength channels associated with said optical network.

7. The method in accordance with claim 1 wherein said Network Control Element is further operable to monitor channel signal to noise ratio for each of said plurality of wavelength channels associated with said optical network.

8. A device for monitoring a plurality of wavelength channels within an optical network having a Network Control Element, said device comprising:

means for detecting at the optical layer, at a first location within said optical network, a plurality of optical intensities corresponding to said plurality of wavelength channels associated with said optical network, means for converting said plurality of optical intensities to a corresponding plurality of optical intensity signal values; and means for conveying said corresponding plurality of optical intensity signal values to said Network Control Element, wherein said Network Control Element analyzes said corresponding plurality of optical intensity signal values to determine whether a fault exists within said optical network.

9. The device in accordance with claim 8 wherein said optical network is a wavelength-division-multiplexed optical network.

10. The device in accordance with claim 8 further comprising:

means for launching an optical test signal onto said optical network to perform out-of-service testing of said optical network.

11. The device in accordance with claim 10 wherein said means for launching an optical test signal is a laser.

12. The device in accordance with claim 8 further comprising:

means for detecting, at the optical layer and at a second location within said optical network, a second plurality of optical intensities corresponding to said plurality of wavelength channels associated with said optical network;

means for converting said second plurality of optical intensities to a corresponding second plurality of optical intensity signal values; and means for conveying said corresponding second plurality of optical intensity signal values to said Network Control Element, wherein said Network Control Element compares said corresponding plurality of optical intensity signal values with said second corresponding plurality of optical intensity signal values to locate a detected fault within said optical network.

* * * * *